United States Patent [19]
Capaldi

[11] 4,437,354
[45] Mar. 20, 1984

[54] TORQUER ASSEMBLIES FOR GYROSCOPE APPARATUS

[75] Inventor: Nicholas R. Capaldi, Cheltenham, England

[73] Assignee: Smiths Industries Public Limited Company, London, England

[21] Appl. No.: 285,193

[22] Filed: Jul. 20, 1981

[30] Foreign Application Priority Data

Jul. 29, 1980 [GB] United Kingdom ................ 8024746

[51] Int. Cl.³ .............................................. G01C 19/30
[52] U.S. Cl. .................................................... 74/5.46
[58] Field of Search ........................ 74/5.46, 5.47, 5.41

[56] References Cited

U.S. PATENT DOCUMENTS

| | | | |
|---|---|---|---|
| 2,948,813 | 8/1960 | Osborne | 74/5.47 X |
| 3,362,232 | 1/1968 | Swanson et al. | 74/5.46 X |
| 3,438,270 | 4/1969 | Binder et al. | 74/5.47 |
| 4,189,948 | 2/1980 | Buckley et al. | 74/5.46 |
| 4,290,316 | 9/1981 | Noar et al. | 74/5.46 |

FOREIGN PATENT DOCUMENTS 2751040  5/1978  Fed. Rep. of Germany ....... 74/5.46
1545774  5/1979  United Kingdom .

Primary Examiner—Rodney H. Bonck
Attorney, Agent, or Firm—Pollock, Vande Sande & Priddy

[57] ABSTRACT

A gyroscope inertia ring torquer has an inertia ring formed of an annular sleeve of magnetic material around which are mounted two annular permanent magnets. The permanent magnets produce radially directed fields of opposite polarities. The torquer also has four fixed electrical coils equally spaced outwardly of the inertia ring around a portion of the gyroscope casing, of a magnetic material. The coils are arranged, when energized, to produce radial magnetic fields which interact with the fields produced by the permanent magnets and thereby apply a restoring torque to the inertia ring. The permanent magnets are spaced from one another such that the torque produced by the interaction of the magnets with the casing is a minimum.

11 Claims, 4 Drawing Figures

TORQUER ASSEMBLIES FOR GYROSCOPE APPARATUS

BACKGROUND OF THE INVENTION

This invention relates to electromagnetic torquer assemblies and gyroscope apparatus including such torquer assemblies.

The invention is more particularly concerned with electromagnetic torquer assemblies for dynamically-tuned gyroscopes.

Torquer assemblies are used in gyroscope apparatus to provide a restoring torque on the gyroscope inertia ring, the restoring torque necessary to maintain the ring in a datum position being a measure of the rate of displacement of the gyroscope.

Torquers comprise one or more electrical coils and one or more permanent magnets mounted on the inertia ring. The coils are supplied with electric current to produce a magnetic field that interacts with the field of the permanent magnets, thereby providing a restoring torque on the ring. Conventionally, each coil is of rectangular shape and is mounted at one edge only, the other edge projecting within a gap in the magnet assembly. This arrangement, however, has several disadvantages in that, because the coil is supported at one edge, it lacks rigidity and has poor thermal contact with the casing. The magnet assembly is typically a single magnet having two soft iron pole pieces defining the gap within which the coil projects. The efficiency of such an arrangement is low because of leakage of flux from the magnet assembly, and because only a part of the coil is located within the strongest part of the field produced by the permanent magnet.

BRIEF SUMMARY OF THE INVENTION

It is an object of the present invention to provide a torquer assembly that may be used substantially to alleviate the above-mentioned disadvantages.

According to one aspect of the present invention, there is provided a torquer assembly for producing a restoring force on a rotatable member of gyroscope apparatus, wherein the torquer assembly comprises a permanent magnet assembly mounted with said rotatable member and arranged to produce a magnetic field directed substantially radially of the axis of rotation of said rotatable member, and an electric coil assembly located radially outwards of said permanent magnet assembly and fixedly mounted with said apparatus within the field of said permanent magnet assembly.

In this way, substantially the entire coil assembly may be located in the field of the permanent magnet assembly. Also, only one air gap between the permanent magnet assembly and the coils is necessary. The leakage of flux from the permanent magnet assembly can furthermore in this way be minimized. Since the coil assembly does not have to project within a gap in the permanent magnet assembly, as with previous arrangements, the coils can be secured along their entire length thereby promoting dissipation of heat and increasing their rigidity.

The electric coil assembly may include a plurality of coils mounted on the inner surface of an annular member of magnetic material through which a part of the magnetic field produced by said coils is directed. The annular member may form a part of the casing of said gyroscope apparatus. The permanent magnet assembly may include two permanent magnets that are arranged to produce magnetic fields of opposite polarity. The permanent magnets may be spaced from one another along said axis, their separation being such that the torque produced by interaction of the magnetic field of said permanent magnet assembly with the gyroscope casing is a minimum.

A dynamically-tuned gyroscope including a torquer assembly, both in accordance with the present invention, will now be described, by way of example, with reference to the accompanying drawings.

DETAILED DESCRIPTION

Figure 1:
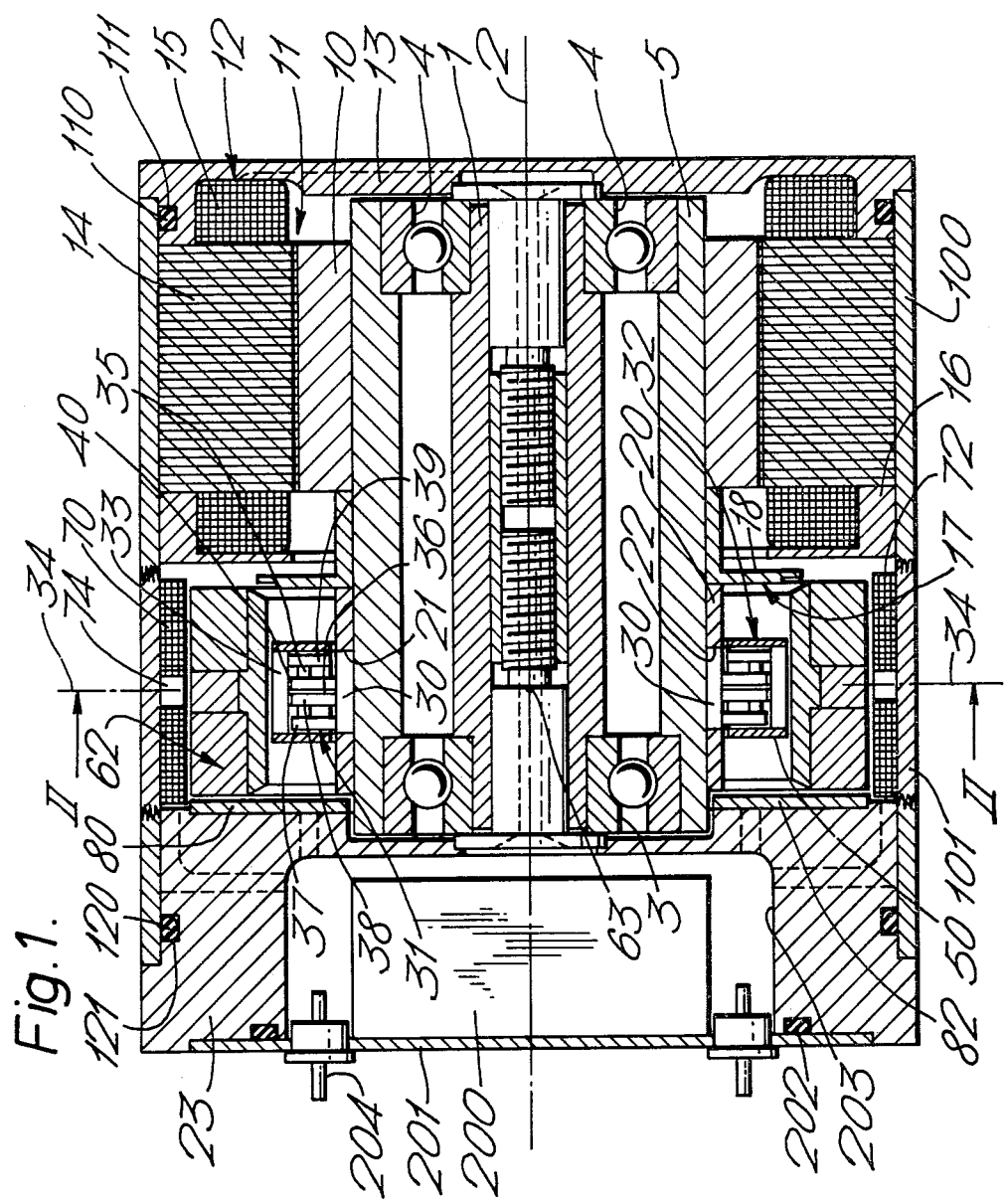
FIG. 1 is a cross-sectional elevation along the length of the gyroscope.
Figure 2:
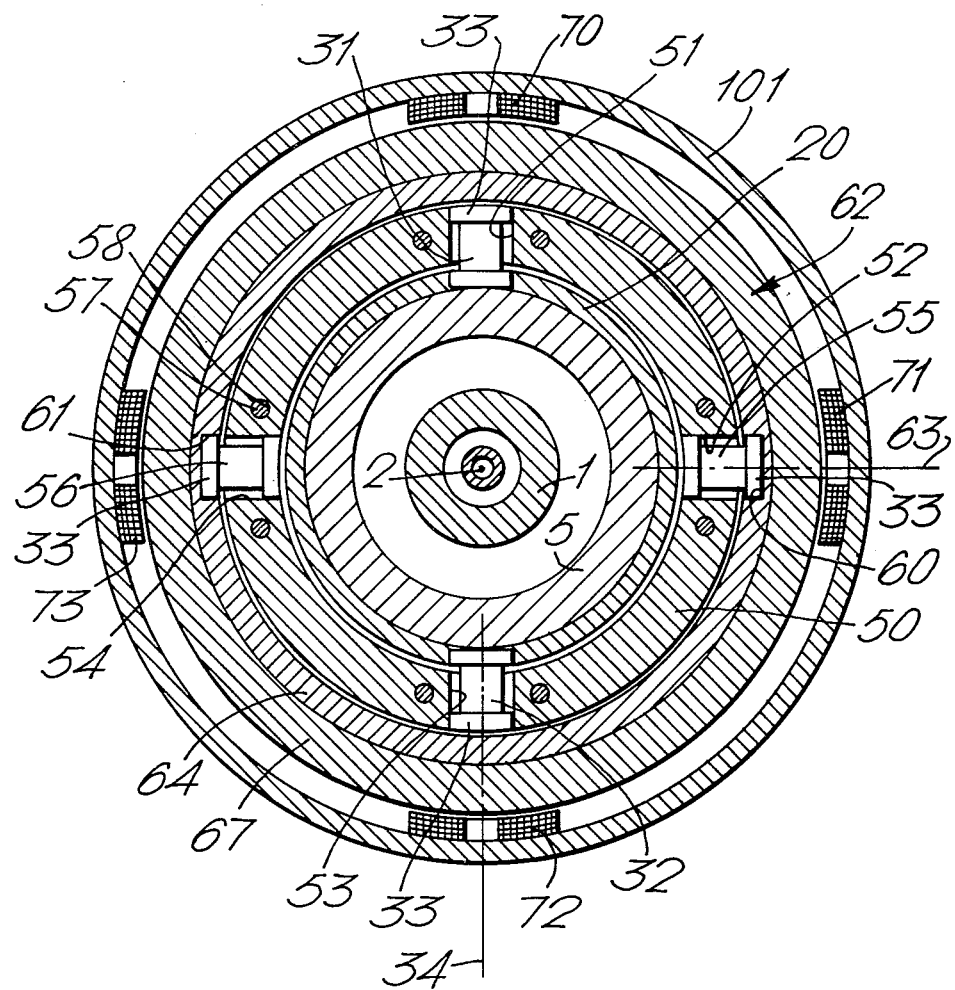
FIG. 2 is a cross-sectional view across the diameter of the gyroscope along line II—II.

With reference to FIGS. 1 and 2, the gyroscope has a tubular journal shaft 1 that extends along a central axis 2 of the gyroscope. The journal shaft 1 has two ball-bearings 3 and 4 at opposite ends that support a cylindrical rotor 5 of steel which embraces the journal shaft 2.

A steel alloy hysteresis ring 10 embraces the right-hand end of the rotor 5 and is secured thereto by means of a suitable adhesive. The hysteresis ring 10 forms a part of an electric motor 11 which also includes a stator assembly 12 mounted on an end flange 13. The stator assembly 12 is of annular form, extending around the hysteresis ring 10, and comprises a laminated core 14 and electrical windings 15. The core 14 is separated from the hysteresis ring 10 by a small gap sufficient to permit free running of the rotor 5. To aid dissipation of heat from the motor coils 15, the stator assembly 12 is a close fit with the end flange 13; any interstices between the two components may be filled with a heat-conductive adhesive. The effects of stray magnetic fields from the motor 11 are reduced by use of an annular magnetic shield 16, of L-shape in cross-section, which contacts the inner surface of a tubular outer housing 100 of the gyroscope. The shield 16 is secured with adhesive to the side of the laminated core 14 and extends radially inwards on one side of the windings 15. A second annular member 17 is secured to the rotor 5 and has a radially projecting flange 18 that overlaps the other shield 16. The second shield 17 rotates with the rotor 5 and is separated from the fixed shield 16 by a narrow gap sufficient to permit free rotation and to function as a mechanical stop.

A slim metal mounting sleeve 20 is also secured about the rotor 5, at the opposite end to the hysteresis ring 10. The mounting sleeve 20 has two circular apertures 21 and 22 formed through its wall and located diametrically opposite one another. The apertures 21 and 22 retain the inner end 30 of two flexure pivot assemblies 31 and 32 respectively such that the assemblies project radially outwardly of the sleeve 20.

The flexure pivot assemblies 31 and 32 may be of the kind shown and described in detail in U.K. patent specification No. 1,545,774. Briefly, these assemblies have two circular mounting plates 30 and 33 which are resiliently interconnected with one another to permit limited relative angular displacement between them about an axis 34. More particularly, the assemblies 31 and 32 have a pair of crossed leaf springs 35 and 36, one end of which is held between a pair of pins 37 and 38 supported by one mounting plate 30, and the other end of which is held between a pair of pins 39 and 40 supported by the other mounting plate 33.

The outer mounting plates 33 of the flexure pivot assemblies 31 and 32 are secured to a gimbal ring 50. The gimbal ring 50 coaxially embraces the mounting sleeve 20 and the rotor 5, and four radially-extending circular holes 51 to 54 (FIG. 2) formed at equally-spaced intervals about the gimbal ring. The gimbal ring 50 is mounted with the rotor 5 for limited angular displacement about the axis 34, at right angles to the shaft axis 2, by means of the two flexure pivot assemblies 31 and 32. More particularly, the outer mounting plates 33 of the flexure-pivot assemblies 31 and 32 are brazed in the outer end of the holes 51 and 53 such that the ends of the mounting plates are flush with the outer surface of the gimbal ring 50. In this way, the separation between the gimbal ring 50 and the mounting sleeve 20 is reduced to a minimum, therby leading to a compact configuration. Containing the major part of the flexure-pivot assemblies 31 and 32 within the radial thickness of the gimbal ring 50 also protects the flexure-pivot assemblies and reduces aerodynamic resistance to rotation.

A further two flexure-pivot assemblies 55 and 56 (FIG. 2) are mounted with the gimbal ring 50, in the holes 52 and 54 respectively. These further pivot assemblies 55 and 56 extend radially outwards from the gimbal ring 50 having their inner mounting plates 30 brazed into the holes 52 and 54 such that the end surfaces are flush with the inner surface of the gimbal ring. The outer mounting plates 33 of the assemblies 55 and 56 are brazed into holes 60 and 61 respectively in the inner surface of an inertia ring 62. The inertia ring 62 extends concentrically about the gimbal ring 50, the flexure pivot assemblies 55 and 56 serving to mount the inertia ring for limited angular displacement about an axis 63 at right angles to the gimbal displacement axis 34 and to the shaft axis 2. The separation between the inertia ring 62 and the gimbal ring 50 can be small because a major part of the length of the flexure pivot assemblies 55 and 56 is contained within the thickness of the gimbal ring.

The gimbal ring 50 has eight grub screws 57 located in pairs on either side of the flexure pivot assemblies 31, 32, 55 and 56. The screws 57 are screwed into tapped holes 58 so that the balance of the gimbal ring 50 can be adjusted by screwing into or out of the tapped holes.

Figure 3:
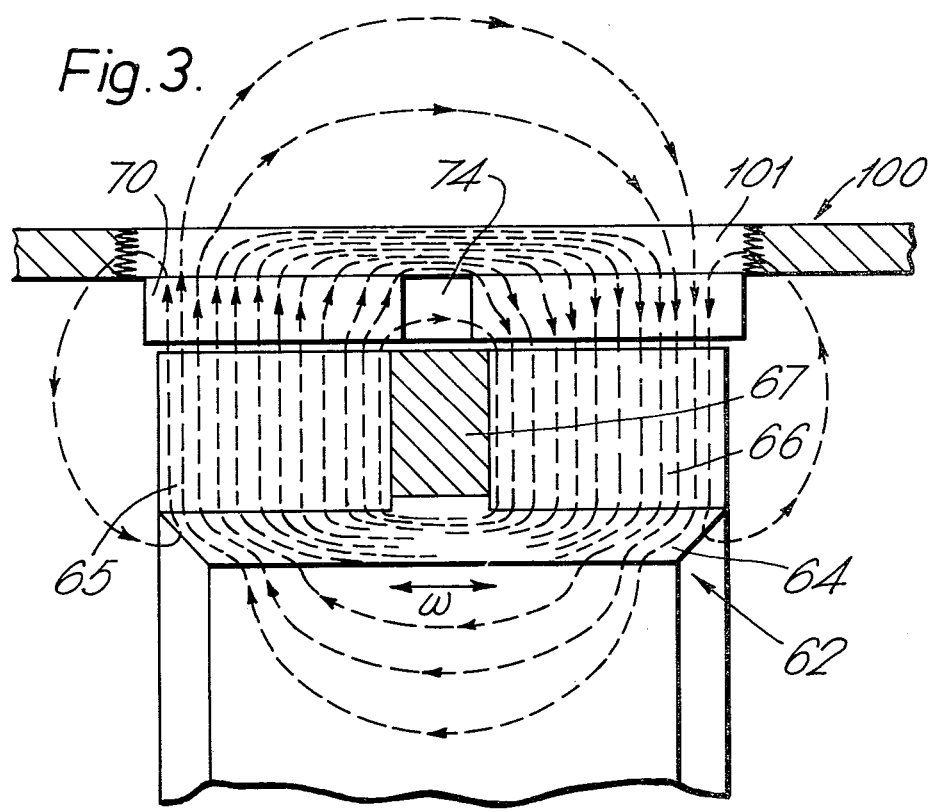
FIG. 3 shows the torquer assembly of the gyroscope in greater detail.

The inertia ring 62 is shown in more detail in FIG. 3 and has an annular soft iron sleeve 64 about which extend two annular rare-earth permanent magnets 65 and 66. The magnets 65 and 66 are located at opposite ends of the sleeve 64 being separated from one another by a filling piece 67 and secured in position by means of an adhesive. The magnets 65 and 66 are radially magnetised in opposite senses such as to produce magnetic lines of flux that are directed radially outwardly and inwardly respectively forming a closed loop with each other. The outer casing of the gyroscope 100 is formed with an annular portion 101 of a magnetic material, such as, soft iron, that embraces the permanent magnet assembly provided by the inertia ring 62. This portion 101 forms a return path for the magnetic lines of force on one side of the permanent magnets, the inner sleeve 64 forming a return path on the other side.

Four electrical torque coils 70 to 73 are mounted on the inner surface of the portion 101 of the casing 100. The coils 70 to 73 are each of a rectangular configuration having an open centre 74. The axes of the windings of the coils 70 to 73 extend radially of the gyroscope, the coils being equally spaced around the casing 100. The coils are secured to the casing 100 by means of an adhesive so as thereby to ensure good thermal contact and ready dissipation of heat through the casing. Because the entire of one face of each coil is secured to the casing, the coils are maintained rigid and there is little risk of damage or deformation to the coils on vibration.

The lines of force of the permanent magnets 65 and 66 thereby pass through substantially the whole of the coils 70 to 73 giving the maximum possible restoring torque for the current supplied to the coils. Leakage of flux is also substantially avoided because the lines of magnetic force pass directly through the coils without the interposition of pole members. The arrangement of the present invention also has an advantage over previous arrangements, in which the coils project between two pole members of a permanent magnet, since the previous arrangements require tow air gaps—one on either side of the coils—whereas the present arrangement requires only one air gap.

Because the magnetic circuit of the inertia ring 62 is completed through the portion 101 of the outer casing 100, the inertia ring will interact with the casing. In normal circumstances there would be a magnetic restoring torque acting on the inertia ring 62 tending to align the inertia ring axially within the casing 100. Such a restoring torque is, however, undesirable since it produces additional stiffness in the mounting of the inertia ring 62. It has been found that the restoring torque can be minimized by the use of two magnets separated from one another by the correct distance.

Figure 4:
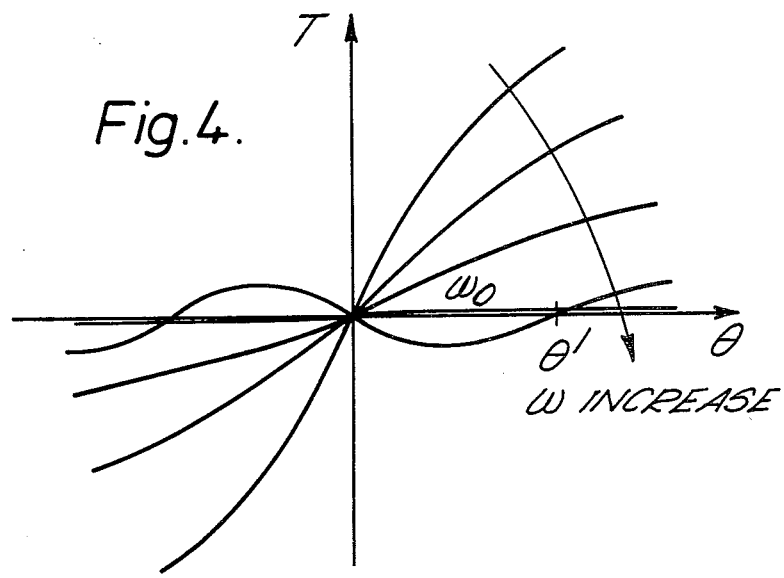
FIG. 4 is a graph showing the variation in torque exerted on a part of the gyroscope with displacement.

With tow radially-magnetised annular magnets separated from one another by a small distance w there will be a torque T tending to restore the assembly to axial alignment (that is, $\theta=0$) with the casing, the torque T increasing as the angle $\theta$ of displacement increases in the manner shown in FIG. 4, thereby producing a stable condition. If the separation w is increased, the restoring torque T will be correspondingly reduced until, when w is large enough, the torque becomes negative tending to restore the assembly to an orientation that is not in alignment with the gyroscope casing 100 but is offset at an angle $\theta'$. This will therefore produce an unstable state where a small deflection of the magnet assembly away from $\theta=0$ will cause it to swing to $\theta=\theta'$ and be oriented skew within the casing 100. There is, however, a critical separation $w_o$ at which there is substantially no restoring torque on the assembly even when it is deflected away from $\theta=0$, and the assembly thereby behaves as though freely suspended. This critical separation $w_o$ depends on many factors such as the dimensions of the magnets and the separation between the magnet assembly and the casing, and will therefore be different for different magnet assemblies and gyroscopes. The separation can, however, readily be determined by extrapolation using two magnets the separation of which is adjustable.

Mounted close to the torque coils 70 and 73 are respective capacitive pick-off plates 80 to 83 which are responsive to displacement of the inertia ring 62 about the axis 34 and the axis 63. The torque coils 70 to 73 are mounted outside the pick-off plates 80 to 83, that is, they are located further away from the axis 2 than the pick-off plates. In this way, because of the greater leverage, less power is required to provide an equivalent torque than would be the case with torque coils mounted closer to the axis 2, on the opposite side of the pick-off assemblies 80 to 83.

The outer housing 100 is in the form of a tubular metal shell that extends between the right-hand end flange 13 and a left-hand flange 23, and is sealed with them by means of O-rings 110 and 120, which lie in annular grooves 111 and 121 respectively around the outer surface of the flanges, and by means of a capillary sealant composition applied between the shell and end flanges. The tubular shell 100 is contacted internally along a major part of its length, thereby leading to improved dissipation of heat from the motor 11 and a consequent reduction in theremal gradients within the gyroscope.

The gyroscope also includes an electronics unit 200 which is mounted on a circular cover plate 201. The cover plate 201 is sealed with the flat end face of the left-hand flange 23 by means of an O-ring 202 such that the electronics unit 200 lies in a well 203 formed by the end flange. The electronics unit 200 controls energisation of the motor windings 15 and the torque coils 70 to 73, and also receives the output of the pick-off plates 80 to 83.

The cover plate 201 carries electrical terminals 204 (only two of which are shown) which make connection with the electronics unit 200 and to which external electrical connection of the gyroscope is made.

In operation, the motor windings 15 are suitably energised to cause high speed rotation of the rotor 5, the gimbal ring 50 and the inertia ring 62 about the gyroscope axis 2. The speed of rotation is chosen to be that at which the inertia ring 62 becomes decoupled from the rotor 5, that is, in which the inertia ring becomes dynamically tuned and behaves as though freely floating in space. The gyroscope may additionally include suitable rotational speed pick-offs to indicate the speed of the inertia ring 62 so that correction may be applied to ensure the correct running speed. The output of the displacement pick-offs 80 to 83 remain constant and identical, and the torque coils 70 to 73 remain unenergised, so long as the gyroscope is not moved in such a way as to have a component of displacement about an axis at right angles to the rotational axis 2.

If, however, the gyroscope is moved such as to have, for example, a component of displacement clockwise about the axis 63, the inertia ring 62 will tend to maintain its original attitude and will thereby be displaced anti-clockwise relative to the gyroscope housing. In this way, the inertia ring 62 will be displaced towards the pick-off plate 80 and away from the pick-off plate 82, although it will remain at substantially the same separation from the other pick-off plates 81 and 83. The output of the pick-off plates 80 and 82 will therefore change differentially, indicating displacement about the axis 63.

Similarly, if the gyroscope is moved such as to have a component of displacement about the axis 34, the inertia ring 62 will tend to maintain its original attitude and will thereby be displaced towards one of the pick-off plates 81 and 83, and away from the other plate.

As soon as a differential change in the output of opposite pick-off plates 80 and 82, or 81 and 83 is sensed, current is supplied in the appropriate sense to corresponding torque coils 70 and 72, or 71 and 73 causing radially directed fields to be produced which interact with the permanent magnets in a sense tending to restore the inertia ring 62 to its original position relative to the gyroscope housing.

By replacing the conventional rotating shaft of previous dynamically tuned gyroscopes by a rotor 5 of tubular form that is supported from within, the gimbal ring 50 and inertia ring 62 can be mounted directly on the rotating member intermediate its supported ends. It can be seen therefore that the problems of stress, vibration and noise are substantially reduced in the present arrangement. Furthermore, by mounting the flexure pivot assemblies 31, 32, 55 and 56 to extend within the radial thickness of the gimbal ring 50, the diameter of the gyroscope can be kept to a minimum thereby giving a compact overall configuration. The gyroscope design has high symmetry and a low number of component parts, the majority of which are of simple geometric shape and consequently can be manufactured to high accuracy inexpensively.

What I claim is:

1. A torquer assembly for producing a restoring force on a rotatable member of gyroscope apparatus, about an axis substantially at right angles to the axis of rotation of the rotatable member, wherein the torquer assembly comprises: a permanent magnet assembly; means mounting said permanent magnet assembly with said rotatable member so as to produce a magnetic field directed substantially radially of the axis of rotation of said rotatable member; an electric coil assembly including an annular member of magnetic material fixedly mounted with said gyroscope apparatus radially outwards of said permanent magnet assembly, and a plurality of coils mounted on the inner surface of said annular member within the field of said permanent magnet assembly, a part of the magnetic field produced by said coils being directed through said annular member.

2. A torquer assembly according to claim 1, wherein said annular member forms a part of the casing of said gyroscope apparatus.

3. A torquer assembly according to claim 1, wherein said permanent magnet assembly includes two permanent magnets that produce magnetic fields of opposite polarity.

4. A torquer assembly according to claim 3, wherein said two permanent magnets are spaced from one another along the axis of rotation of the rotatable member.

5. A torquer assembly according to claim 4, wherein the separation of said two permanent magnets from one another is chosen such that the torque produced by the interaction of the magnetic field of said permanent magnet assembly with the casing of said gyroscope is a minimum.

6. A torquer assembly according to claim 3, wherein said permanent magnet assembly includes an annular member of magnetic material, and means mounting said permanent magnets on an outer surface of said annular member.

7. A torquer assembly according to claim 1, wherein said rotatable member is an inertia ring of said gyroscope.

8. A torquer assembly for producing a restoring force on an inertia ring of gyroscope apparatus, wherein the torquer assembly comprises: two permanent magnets of annular form mounted co-axially of one another with said inertia ring to produce substantially radially directed fields of opposite polarity; and a plurality of electrical coils mounted around the casing of said gyroscope apparatus outwardly of said inertia ring within the fields of said permanent magnets.

9. A torquer assembly according to claim 8, where said permanent magnets are separated from one another axially, the separation being chosen such that the torque produced by interaction of the magnetic fields of said permanent magnets with the casing of said gyroscope apparatus is a minimum.

10. Gyroscope apparatus including an inertia ring, a motor that rotates said inertia ring about its axis, and a torquer assembly that is operative to apply a restoring torque to maintain the datum position of said inertia ring, wherein said torquer assembly comprises two permanent magnets of annular form mounted co-axially of one another with said inertia ring to produce substantially radially directed fields of opposite polarity, and a plurality of electrical coils mounted around the casing of said gyroscope apparatus outwardly of said inertia ring within the fields of said permanent magnets.

11. A torquer assembly for producing a restoring force on a rotatable member of gyroscope apparatus about an axis substantially at right angles to the axis of rotation of said rotatable member, wherein the torquer assembly comprises: a permanent magnet assembly having two permanent magnets of annular form mounted co-axially of one another with said rotatable member, said magnets each producing a substantially radially directed field of opposite polarities; and an electric coil assembly having a plurality of electrical coils mounted on the inner surface of an annular member outwardly of said rotatable member within the fields of said permanent magnets, a part of the magnetic field produced by said coils being directed through said annular member.

* * * * *